(12) United States Patent
Savidge

(10) Patent No.: US 11,186,353 B2
(45) Date of Patent: Nov. 30, 2021

(54) PASSENGER DOOR WITH DEPLOYABLE LOWER STEP

(71) Applicant: BOMBARDIER INC., Dorval (CA)

(72) Inventor: John Richard Savidge, Sooke (CA)

(73) Assignee: BOMBARDIER INC., Dorval (CA)

( * ) Notice: Subject to any disclaimer, the term of this patent is extended or adjusted under 35 U.S.C. 154(b) by 76 days.

(21) Appl. No.: 16/696,099

(22) Filed: Nov. 26, 2019

(65) Prior Publication Data
US 2020/0164956 A1 May 28, 2020

Related U.S. Application Data

(60) Provisional application No. 62/771,756, filed on Nov. 27, 2018.

(51) Int. Cl.
*B64C 1/14* (2006.01)
*B64C 1/24* (2006.01)

(52) U.S. Cl.
CPC ............. *B64C 1/1423* (2013.01); *B64C 1/24* (2013.01)

(58) Field of Classification Search
CPC ................ B64C 1/24; B64C 1/1423
USPC ............................. 244/129.6, 118.3
See application file for complete search history.

(56) References Cited

U.S. PATENT DOCUMENTS

| 2,933,149 | A | * | 4/1960 | Royal | B64C 1/24 |
| | | | | | 182/78 |
| 3,213,962 | A | * | 10/1965 | Clark, Jr. | B64C 1/143 |
| | | | | | 182/78 |
| 4,453,684 | A | | 6/1984 | Hanks | |
| 7,677,494 | B2 | | 3/2010 | Yada et al. | |
| 8,196,865 | B2 | | 6/2012 | Martin | |
| 9,932,103 | B2 | | 4/2018 | DeLa Bardonnie et al. | |
| 2008/0099605 | A1 | * | 5/2008 | Yada | B64C 1/143 |
| | | | | | 244/118.3 |
| 2010/0127124 | A1 | * | 5/2010 | Yada | B64C 1/1461 |
| | | | | | 244/118.3 |
| 2016/0214701 | A1 | * | 7/2016 | Probst | B64C 1/1415 |

\* cited by examiner

*Primary Examiner* — Christopher D Hutchens
(74) *Attorney, Agent, or Firm* — Norton Rose Fulbright Canada LLP

(57) ABSTRACT

A mobile platform with a passenger door system having stairs with one or more deployable lower steps and associated methods for deployment and/or stowing of such lower steps are disclosed. In one embodiment, the method comprises using movement of the door to drive a movement of a handrail associated with the stairs, and using the movement of the handrail to drive a movement of the one or more lower steps.

16 Claims, 9 Drawing Sheets

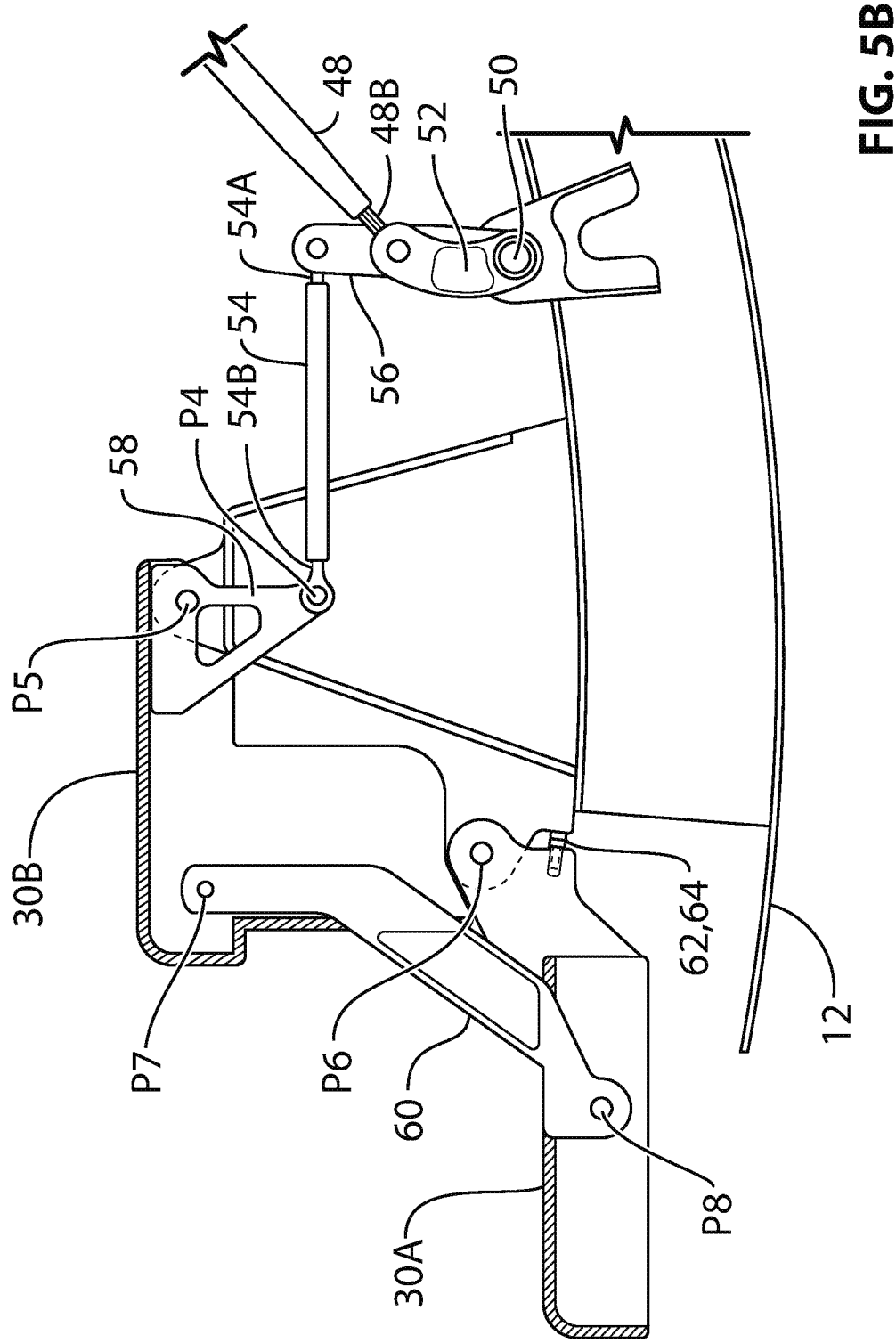

100

USING A MOVEMENT OF A DOOR TO DRIVE A MOVEMENT OF A HANDRAIL ASSOCIATED WITH STAIRS INTEGRATED WITH THE DOOR
102

USING THE MOVEMENT OF THE HANDRAIL TO DRIVE A MOVEMENT OF THE LOWER STEP
104

FIG. 6

PASSENGER DOOR WITH DEPLOYABLE LOWER STEP

CROSS REFERENCE TO RELATED APPLICATION AND CLAIM OF PRIORITY

This application relies for priority on U.S. Provisional Patent Application Ser. No. 62/771,756 filed on Nov. 27, 2018, the entire content of which is incorporated herein by reference.

TECHNICAL FIELD

The disclosure relates generally to mobile platforms such as aircraft, and more particularly to the deployment of one or more lower steps integrated with a passenger door of a mobile platform.

BACKGROUND

Some aircraft have a built-in set of stairs called an "airstair" that permits passengers to board and exit the aircraft. An airstair can be built into an interior side of a clamshell-style door of the aircraft. An airstair can eliminate the need for passengers to use a mobile stairway or jet bridge to board or exit the aircraft. Some airstairs can comprise a deployable lower step in cases where the airstair would otherwise be too high from the ground when the door is fully open. However, existing mechanisms for deploying the lower step can be relatively complex and heavy. Improvement is desirable.

SUMMARY

In one aspect, the disclosure describes an aircraft comprising: a fuselage;
a door pivotally coupled to the fuselage, the door having an interior side facing an interior of the aircraft when the door is closed and an exterior side facing an exterior of the aircraft when the door is closed, the interior side of the door defining an airstair permitting passengers to board the aircraft when the door is open, the airstair having a lower step deployable from a stowed configuration when the door is closed to a deployed configuration when the door is open;
a handrail associated with the airstair, the handrail being deployable from a stowed configuration when the door is closed to a deployed configuration when the door is open, a deployment of the handrail being coordinated with an opening of the door, the handrail being drivingly coupled to the lower step via:
a rotatable first shaft drivingly coupled to the handrail so that the deployment of the handrail drives a rotation of the first shaft; and
a rotatable second shaft drivingly coupled to the first shaft and to the lower step so that rotation of the first shaft drives a rotation of the second shaft, and that the rotation of the second shaft drives a deployment of the lower step.

The handrail may be pivotally coupled to the fuselage and coupled to the door via a support link. A first end of the support link may be pivotally coupled to the handrail. An opposite second end of the support link may be pivotally coupled to the door. The second end of the support link may be drivingly coupled to the first shaft so that rotation of the support link caused by the deployment of the handrail drives the rotation of the first shaft.

The aircraft may comprise: a first crank coupled for common rotation with the first shaft; and a first connecting rod having a first end coupled to the first crank and an opposite second end drivingly coupled to the second shaft so that rotation of the first shaft causes movement of the first connecting rod which drives the rotation of the second shaft.

The aircraft may comprise a second crank coupled for common rotation with the second shaft. The second shaft may be parallel and spaced apart from the first shaft. The second end of the first connecting rod may be coupled to the second crank so that movement of the first connecting rod causes rotation of the second shaft.

The second shaft may be drivingly coupled to the lower step via a second connecting rod.

The second connecting rod may be coupled to the second shaft via a third crank coupled for common rotation with the second shaft.

The lower step may be a first lower step that is a lowermost step on the airstair when the door is open. The airstair may comprise a second lower step immediately succeeding the first lower step. The second lower step may be deployable from a stowed configuration when the door is closed to a deployed configuration when the door is open. The first and second lower steps may be coupled together for coordinated deployment.

The first lower step may be rotatable about a first rotation axis. The second lower step may be rotatable about a second rotation axis different from the first rotation axis. The second connecting rod may be coupled to the second lower step to cause rotation of the second lower step about the second rotation axis. The second lower step may be drivingly coupled to the first lower step via an arm to cause rotation of the first lower step about the first rotation axis.

The airstair may comprise one or more fixed steps that succeed the second lower step.

The lower step may be a first lower step that is a lowermost step on the airstair when the door is open. The airstair may comprise a second lower step immediately succeeding the first lower step. The second lower step may be deployable from a stowed configuration when the door is closed to a deployed configuration when the door is open. The first and second lower steps may be coupled together for coordinated deployment.

The handrail may be drivingly coupled to the lower step via a load transfer path defined by:
a support link having a first end pivotally coupled to the handrail and an opposite second end;
the rotatable first shaft drivingly coupled to the second end of the support link;
a first connecting rod having a first end coupled to the first shaft via a first crank and an opposite second end;
the rotatable second shaft drivingly coupled to the second end of the first connecting rod via a second crank; and
a second connecting rod having a first end coupled to the second shaft via a third crank and an opposite second end drivingly coupled to the lower step.

The airstair may comprise one or more fixed steps that succeed the lower step.

Embodiments can include combinations of the above features.

In another aspect, the disclosure describes a passenger door system for a mobile platform. The system comprises:
a door configured to be pivotally coupled to a structure of the mobile platform, the door having an interior side facing an interior of the mobile platform when the door is closed and an exterior side facing an exterior of the mobile platform when the door is closed, the interior side of the door defining stairs permitting passengers to board the mobile platform when the door is open, the stairs comprising a lower step deployable from a stowed configuration when the door is closed to a deployed configuration when the door is open; and a handrail associated with the stairs, the handrail being deployable from a stowed configuration when the door is closed to a deployed configuration when the door is open, a deployment of the handrail being coordinated with an opening of the door, the handrail being drivingly coupled to the lower step via:

a rotatable first shaft drivingly coupled to the handrail so that the deployment of the support link drives a rotation of the first shaft; and a rotatable second shaft drivingly coupled to the first shaft and to the lower step so that rotation of the first shaft drives a rotation of the second shaft, and that rotation of the second shaft drives a deployment of the lower step.

The handrail may be coupled to the door via a support link. A first end of the support link may be pivotally coupled to the handrail. An opposite second end of the support link may be pivotally coupled to the door. The second end of the support link may be drivingly coupled to the first shaft so that rotation of the support link caused by the deployment of the handrail drives the rotation of the first shaft.

The system may comprise: a first crank coupled for common rotation with the first shaft; and a first connecting rod having a first end coupled to the first crank and an opposite second end drivingly coupled to the second shaft so that rotation of the first shaft causes movement of the first connecting rod which drives the rotation of the second shaft.

The system may comprise a second crank coupled for common rotation with the second shaft. The second shaft may be parallel and spaced apart from the first shaft; and the second end of the first connecting rod may be coupled to the second crank so that movement of the first connecting rod causes rotation of the second shaft.

The second shaft may be drivingly coupled to the lower step via a second connecting rod.

The second connecting rod may be coupled to the second shaft via a third crank coupled for common rotation with the second shaft.

The lower step may be a first lower step that is a lowermost step on the stairs when the door is open. The stairs may comprise a second lower step immediately succeeding the first lower step. The second lower step may be deployable from a stowed configuration when the door is closed to a deployed configuration when the door is open. The first and second lower steps may be coupled together for coordinated deployment.

The first lower step may be rotatable about a first rotation axis. The second lower step may be rotatable about a second rotation axis different from the first rotation axis. The second connecting rod may be coupled to the second lower step to cause rotation of the second lower step about the second rotation axis. The second lower step may be drivingly coupled to the first lower step via an arm to cause rotation of the first lower step about the first rotation axis.

The stairs may comprise one or more fixed steps that succeed the second lower step.

The lower step may be a first lower step that is a lowermost step on the stairs when the door is open. The stairs may comprise a second lower step immediately succeeding the first lower step. The second lower step may be deployable from a stowed configuration when the door is closed to a deployed configuration when the door is open. The first and second lower steps may be coupled together for coordinated deployment.

The handrail may be drivingly coupled to the lower step via a load transfer path defined by:

a support link having a first end pivotally coupled to the handrail and an opposite second end;

the rotatable first shaft drivingly coupled to the second end of the support link;

a first connecting rod having a first end coupled to the first shaft via a first crank and an opposite second end;

the rotatable second shaft drivingly coupled to the second end of the first connecting rod via a second crank; and a second connecting rod having a first end coupled to the second shaft via a third crank and an opposite second end drivingly coupled to the lower step.

The stairs may comprise one or more fixed steps that succeed the lower step.

Embodiments can include combinations of the above features.

In a further aspect, the disclosure describes a mobile platform comprising a system as described herein.

In a further aspect, the disclosure describes a method for actuating a lower step of stairs integrated with a passenger door of a mobile platform. The method comprises:

using movement of the door to drive a movement of a handrail associated with the stairs;

using the movement of the handrail to drive a rotation of a first shaft;

using the rotation of the first shaft to drive a rotation of a second shaft; and using the rotation of the second shaft to drive a movement of the lower step.

The lower step may be a first lower step that is a lowermost step on the stairs when the door is open. The stairs may comprise a second lower step immediately succeeding the first lower step.

The method may comprise: using the movement of the handrail to drive a movement of the second lower step; and using the movement of the second lower step to drive the movement of the first lower step.

Embodiments can include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 5B is a cross-sectional view of the two lower steps of FIG. 4 in a fully deployed configuration, taken along line 5-5 in FIG. 4; and FIG. 6 is a flowchart of a method for actuating one or more lower steps of the door system of FIG. 2.

DETAILED DESCRIPTION

In various embodiments, the passenger door systems and associated methods described herein can facilitate the deployment and stowing of one or more deployable lower steps of stairs integrated into a passenger door of a mobile platform. The systems disclosed herein can permit a deployment and stowing of the lower step(s) that is automatically coordinated (e.g., synchronized) with the opening and closing of the door. In some embodiments, the systems disclosed herein can have a relatively simple construction compared to other existing systems. For example, the systems disclosed herein do not require a separate motor for deploying and/or stowing the deployable lower step(s). The systems disclosed herein can use the movement of a handrail associated with the stairs to actuate the lower step(s).

Even though the following disclosure mainly makes reference to an aircraft door as an example, aspects of the present disclosure can equally apply to doors of other types of mobile platforms such as trains, busses, watercraft (e.g., ships), spacecraft, trucks and other vehicles. Aspects of various embodiments are described through reference to the drawings.

Figure 1:
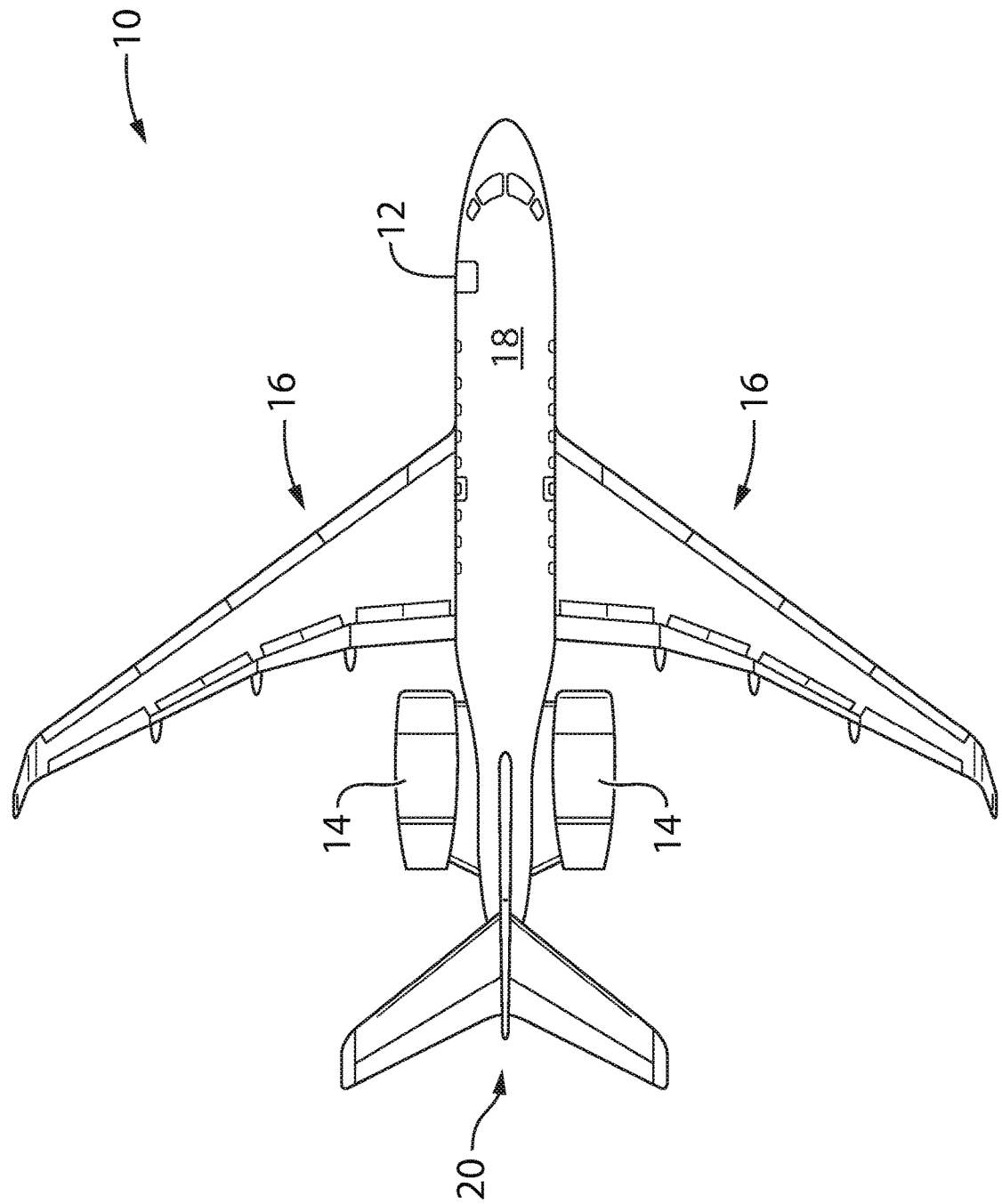
FIG. 1 is a top plan view of an exemplary aircraft comprising a door as described herein.

FIG. 1 is a top plan view of an exemplary aircraft 10 which can comprise passenger door 12 with integrated stairs (i.e., an airstair) as described herein. Aircraft 10 can be a fixed-wing aircraft comprising one or more engines 14. Aircraft 10 can comprise wings 16, fuselage 18 and empennage 20. Aircraft 10 can be any type of aircraft such as corporate, private, commercial and passenger aircraft suitable for civil aviation. For example, aircraft 10 can be a (e.g., ultra-long range) business jet, a twin-engine turboprop airliner or a regional jet airliner.

Figure 2:
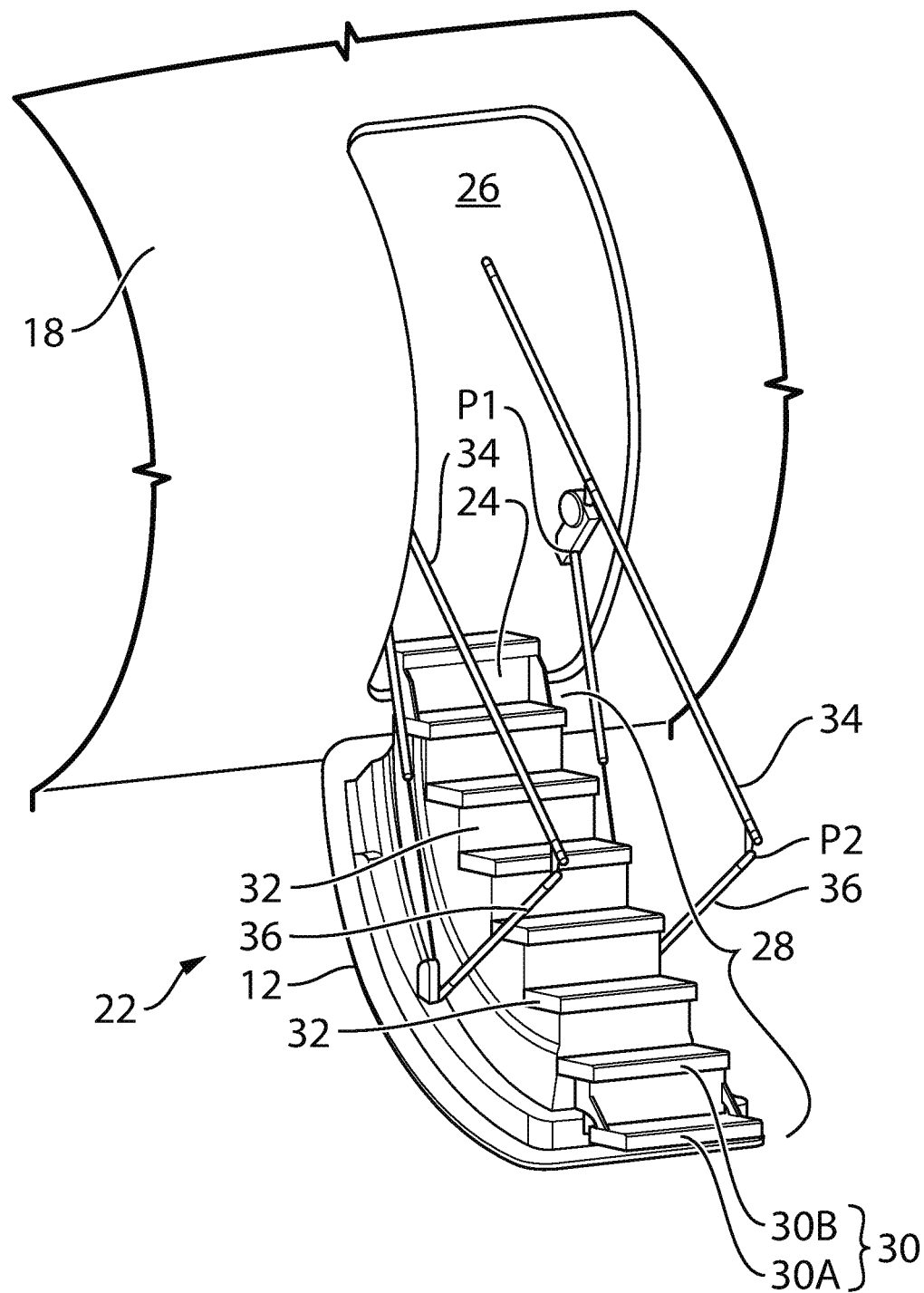
FIG. 2 is a perspective view of a portion of a fuselage with an exemplary passenger door system including the door of the aircraft of FIG. 1 where the door is shown in an open position.

FIG. 2 is a perspective view of a portion of fuselage 18 with door 12 of aircraft 10 shown in an open position. Door 12 can be a clamshell type door and can be part of door system 22 described below. Door 12 can be pivotally coupled to fuselage 18 of aircraft 10 via hinge 24 disposed at a lower portion of opening 26 formed into fuselage 18. Door 12 can have an interior side facing an interior (e.g., passenger cabin) of aircraft 10 when door 12 is closed and an exterior side (e.g., outer skin) facing an exterior of aircraft 10 when door 12 is closed. The interior side of door 12 can define airstair 28 permitting passengers to board and exit aircraft 10 when door 12 is open. Airstair 28 can comprise one or more deployable lower steps 30A, 30B movable between a stowed configuration when door 12 is closed and a deployed configuration when door 12 is open.

FIG. 2 illustrates an embodiment of door system 22 where airstair 28 includes two deployable lower steps 30A, 30B. Lower steps 30A and 30B are referred generically herein as "lower steps 30". Other embodiments of airstair 28 can include a single deployable lower step 30 or more than two deployable lower steps 30. Airstair 28 can comprise one or more fixed (i.e., non-deployable) steps 32 that succeed (i.e., are higher than) deployable lower steps 30 on airstair 28 when door 12 is open. Lower step 30A can be a deployable lowermost step on airstair 28 in relation to door 12 being open. Lower step 30B can be a deployable step immediately succeeding (that is higher than) lower step 30A on airstair 28 in relation to door 12 being open.

Door system 22 can also include deployable handrail 34 associated with airstair 28. Handrail 34 can be movable between a stowed configuration when door 12 is closed to a deployed configuration when door 12 is open. The movement of handrail 34 can be coordinated with the opening/closing movement (e.g., rotation) of door 12. An upper portion of handrail 34 can be pivotally coupled to a (e.g., fixed) structure of fuselage 18 at pivot point P1. A lower portion of handrail 34 can be coupled to door 12 via support link 36. Handrail 34 can be pivotally coupled to support link 36 at pivot point P2. As explained below, handrail 34 can be drivingly coupled to lower steps 30 so that a deployment or stowing of handrail 34 drives a corresponding deployment or stowing of lower steps 30.

In some embodiments, the configuration of door system 22 can permit the use of esthetically pleasing lower steps 30 that, when deployed, have an appearance that is the same or similar to that of fixed steps 32.

Figure 3A:
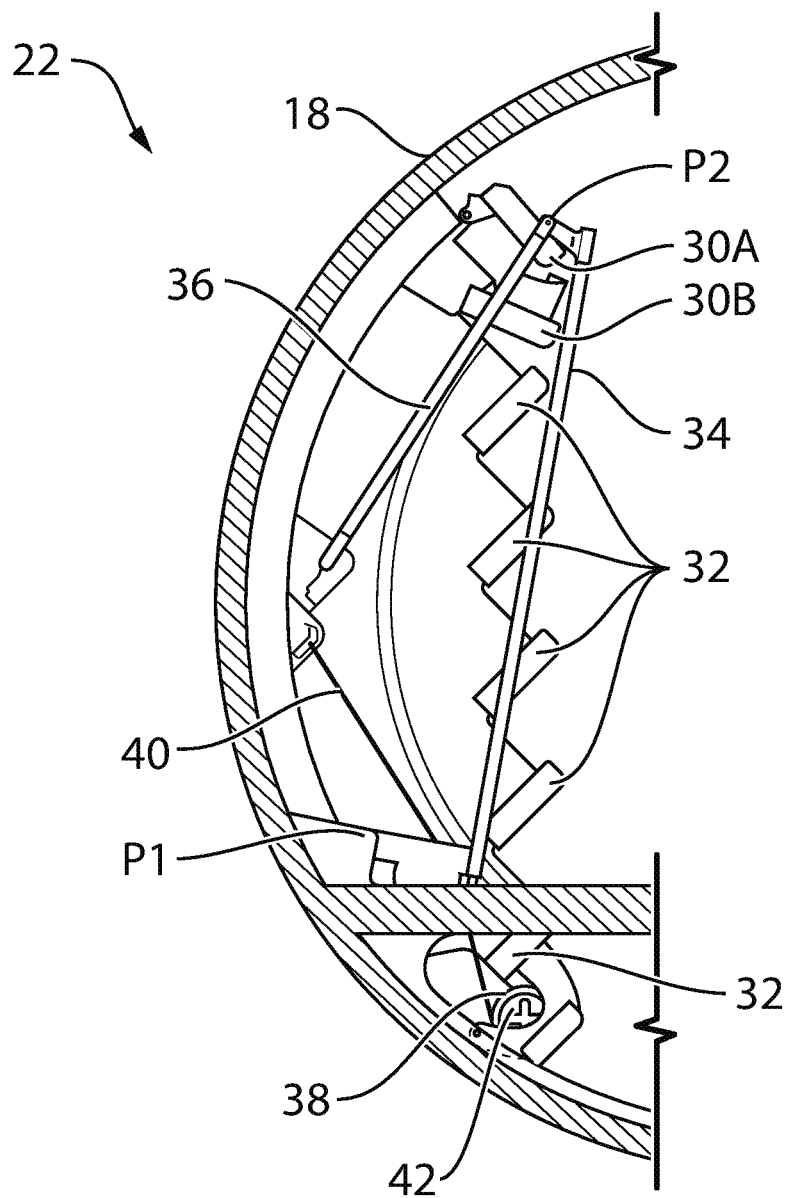
FIG. 3A is a side view of the passenger door system of FIG. 2 with the door being shown in a closed position.
Figure 3B:
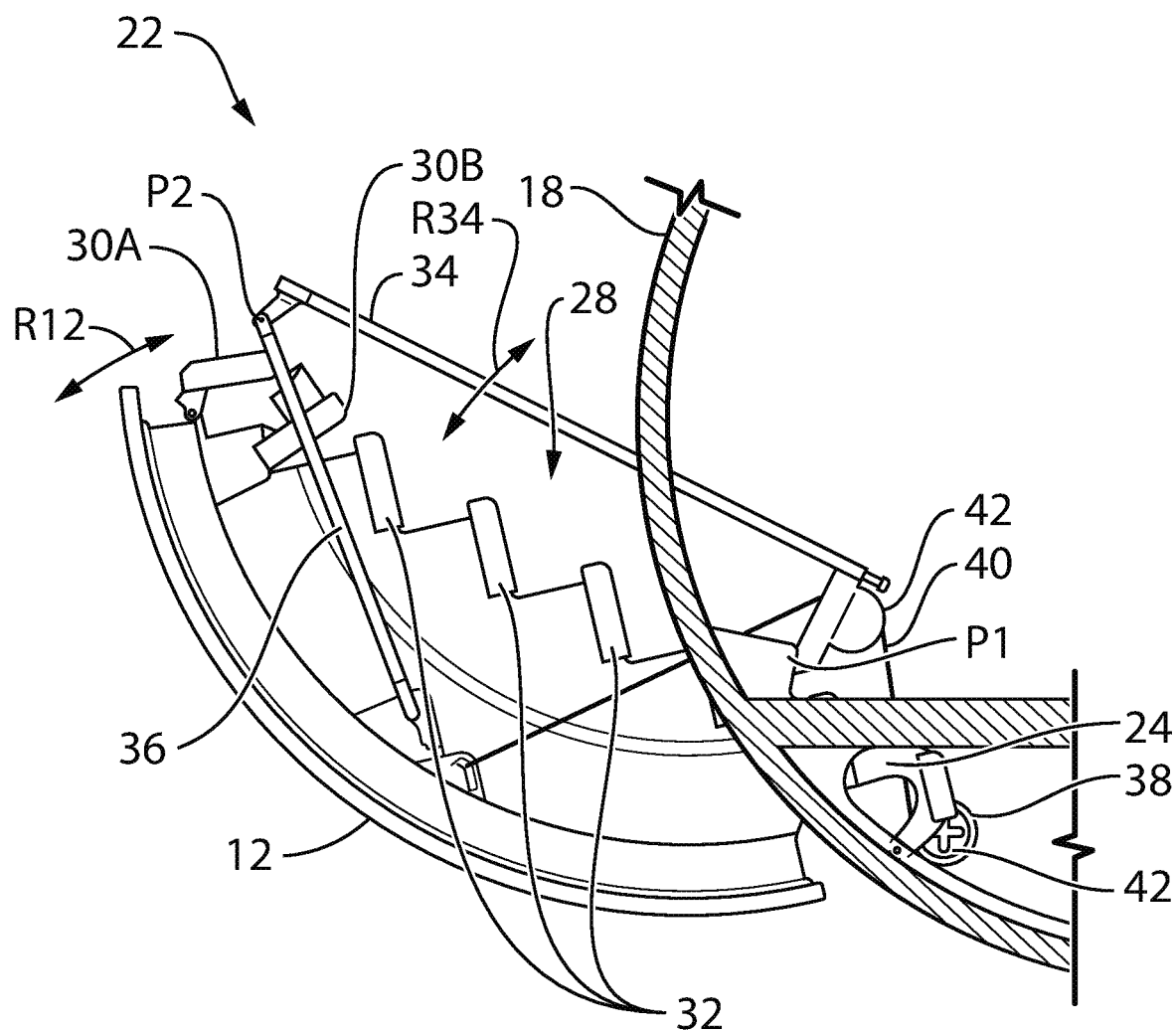
FIG. 3B is a side view of the passenger door system of FIG. 2 with the door being shown in a partially open position.
Figure 3C:
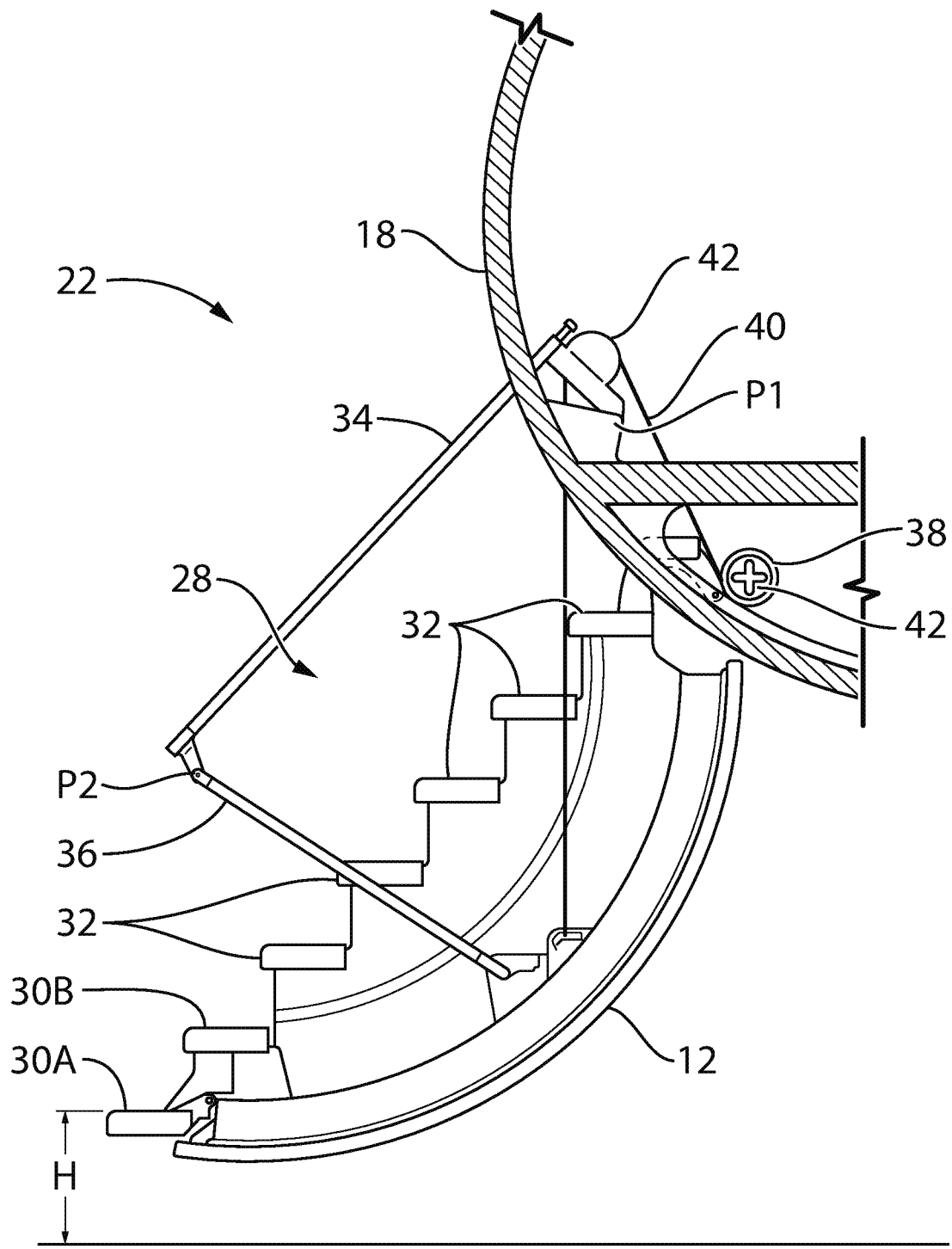
FIG. 3C is a side view of the passenger door system of FIG. 2 with the door being shown in a fully open position.

FIGS. 3A-3C are side views of door system 22 of aircraft 10 where door 12 is in a closed position, in a partially open position and in a fully open position respectively. The deployment and stowing of lower steps 30 can be coordinated with the opening and closing movement (e.g., rotation R12 shown in FIG. 3B) of door 12 so that lower steps 30 are movable between a stowed configuration when door 12 is closed (see FIG. 3A) and a deployed configuration when door 12 is open (see FIG. 3C). The deployment and stowing movement of lower steps 30 can be coordinated with the corresponding opening and closing movement of door 12. In some embodiments, lower step 30A and lower step 30B can be coupled together for coordinated deployment and stowing. When door 12 is fully open, lower step 30A can provide a comfortable height H (see FIG. 3C) from the ground for passengers to step on airstair 28 and board aircraft 10. During closing of door 12, lower steps 30 can become stowed so as to fit within door opening 26 (see FIG. 2) in fuselage 18 and adopt the configuration of FIG. 3A.

In some embodiments, door system 22 can be configured so that the opening and closing of door 12 can be initiated manually either by the flight crew from the interior of aircraft 10 or by the ground crew from the exterior of aircraft 10. In some embodiments door system 22 can comprise an assist mechanism configured to reduce an amount of force required to manually move door 12 between its open and closed positions. In some embodiments, door system 22 can comprise one or more electric motors 38 that can facilitate the opening and/or closing of door 12 for example. FIGS. 3A-3O show motor 38 being mounted to a fixed structure of fuselage 18 and drivingly coupled to door 12 via cable 40 and pulley(s) 42.

Figure 4:
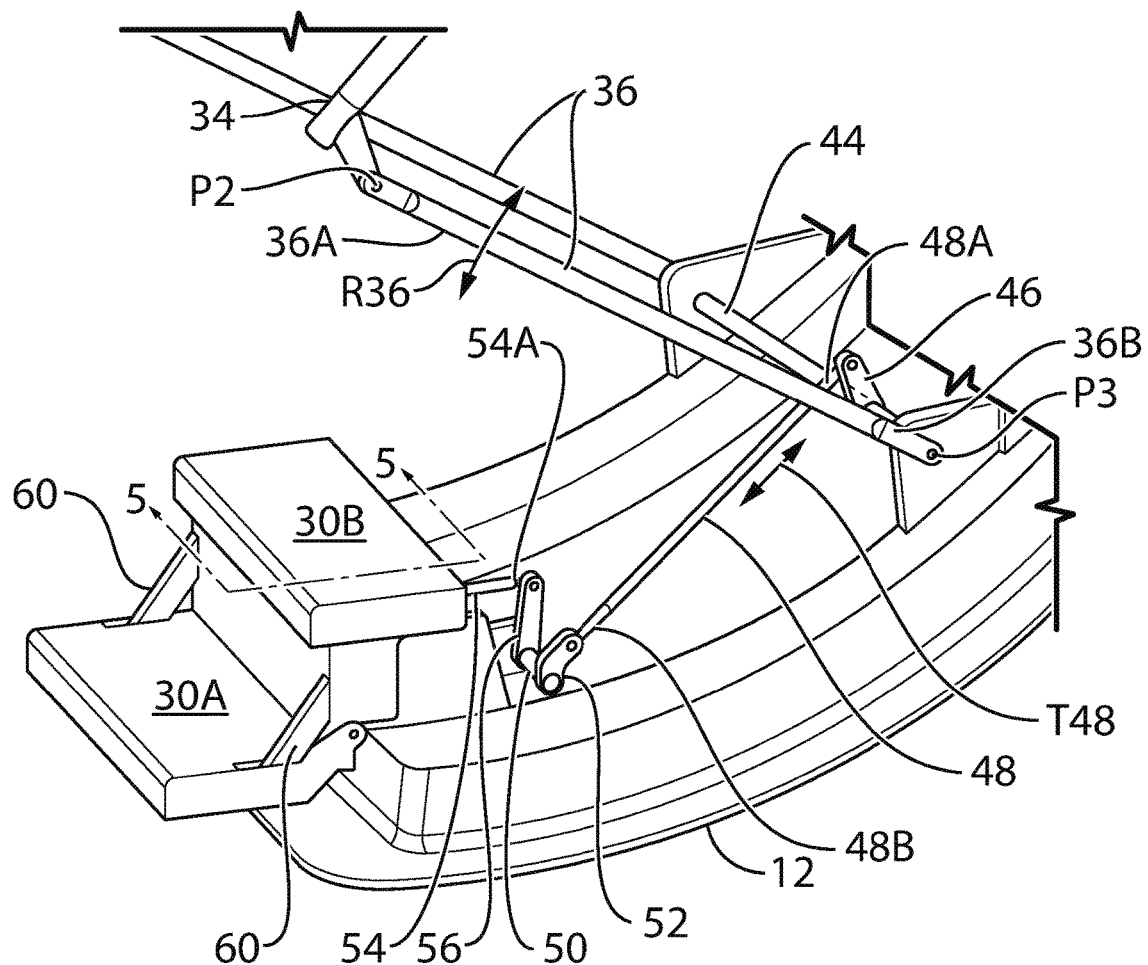
FIG. 4 is a perspective view of an exemplary mechanism for actuating two deployable lower steps of the door system of FIG. 2.

FIG. 4 is a perspective view of a portion of door system 22 with fixed steps 32 of airstair 28 removed in order to show an exemplary mechanism for actuating lower steps 30 of door 12 between the stowed configuration of FIG. 3A and the deployed configuration of FIG. 3C. The mechanism can be housed inside of airstair 28 and hidden from view by fixed steps 32. Door system 22 can comprise other (e.g., latching, locking) mechanisms and components that have been omitted from the figures for clarity. The mechanism shown in FIG. 4 can be relatively simple and compact and can provide reliable deployment and/or stowing of lower steps 30 that can be coordinated with the opening and closing of door 12. The mechanism can permit the deployment and/or stowing of lower steps 30 to be driven by the movement of handrail 34 without requiring a separate motor for actuating lowers steps 30. Accordingly, a motive force that causes movement of door 12 (e.g., rotation R12 shown in FIG. 3B) can be applied to door 12 via motor 38 or otherwise (e.g., gravity during opening of door 12 or other assist mechanism) and some of that motive force can be transferred to lower steps 30 via a load path that comprises door 12, handrail 34, support link 36 and the mechanism shown in FIG. 4 in that order.

Support link 36 can comprise first end 36A that is pivotally coupled to handrail 34 at pivot point P2. Support link 36 can also comprise second end 36B that is pivotally coupled to door 12 at pivot point P3. The mechanism can comprise rotatable first shaft 44 drivingly coupled to second end 36B of support link 36 so that rotation (e.g., see arrow R36) of support link 36 causes rotation of first shaft 44. Door system 22 can comprise one handrail 34 on each side of airstair 28 that have synchronized deployment and stowing and that can both drive first shaft 44 via respective support links 36. For example, support links 36 can each be drivingly coupled to one end of first shaft 44. First crank 46 can be coupled for common rotation with first shaft 44. First connecting rod 48 can have first end 48A coupled to first crank 46 and an opposite second end 48B (e.g., directly or indirectly) drivingly coupled to lower steps 30 so that rotation of first shaft 44 causes (e.g., translation) movement T48 of first connecting rod 48 which can drive the deployment and/or stowing of lower steps 30.

In some embodiments, the mechanism can comprise rotatable second shaft 50 that is spaced apart from first shaft 44. Second shaft 50 can be disposed between first shaft 44 and lower steps 30. Second shaft 50 can have a rotation axis that is substantially parallel to first shaft 44. Second crank 52 can be coupled for common rotation with second shaft 50. Second end 48B of first connecting rod 48 can be coupled to second crank 52 so that movement T48 of first connecting rod 48 caused by the rotation of first shaft 44 in turn causes rotation of second shaft 50.

Second shaft 50 can be drivingly coupled to lower steps 30 via second connecting rod 54. Third crank 56 can be coupled for common rotation with second shaft 50. First end 54A of second connecting rod 54 can be coupled to third crank 56 so that rotation of second shaft 50 caused by the movement T48 of first connecting rod 48 in turn causes (e.g., translation) movement T54 (see FIGS. 5A and 5B) of second connecting rod 54.

Figure 5A:
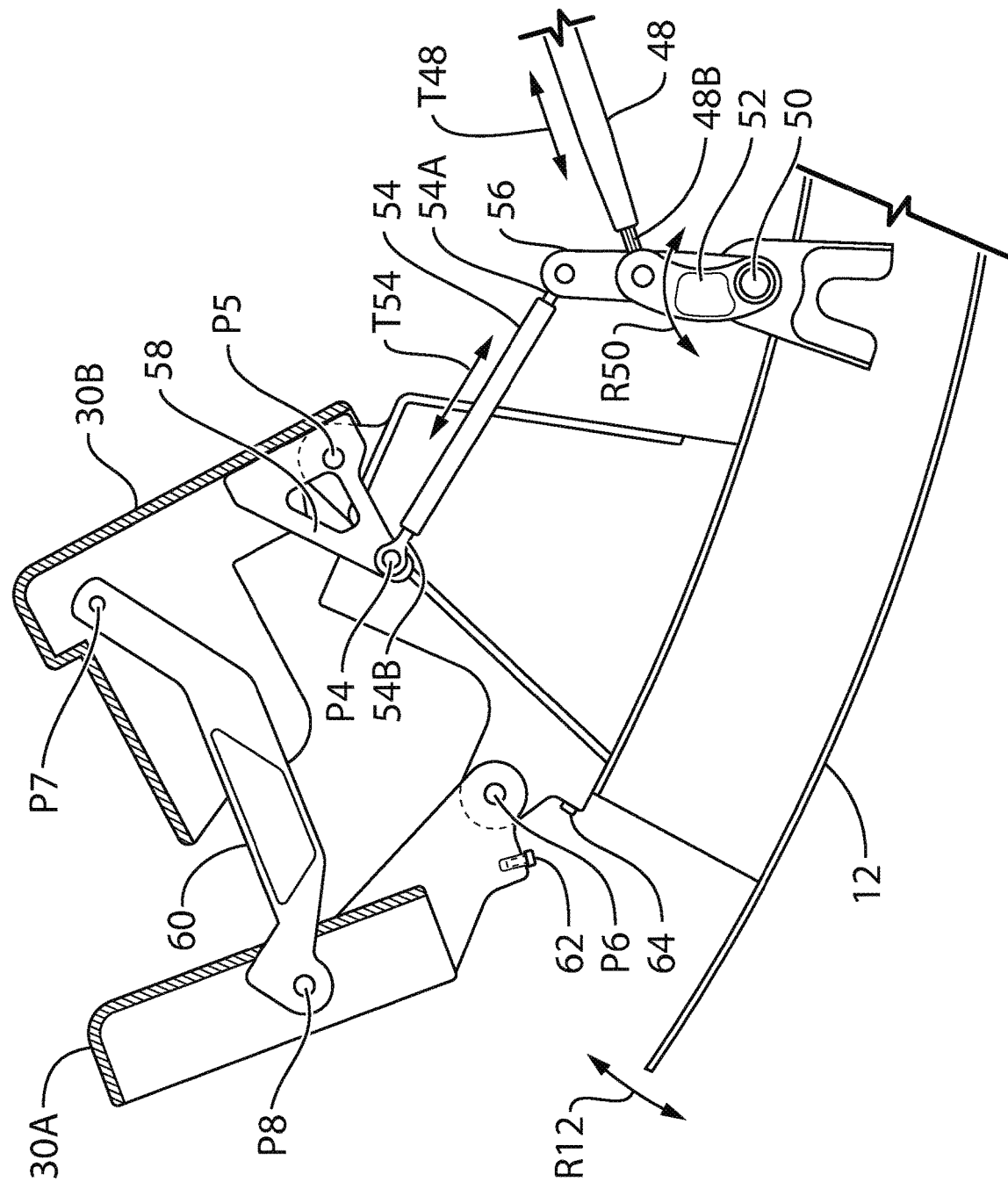
FIG. 5A is a cross-sectional view of the two deployable lower steps of FIG. 4 in a partially deployed configuration, taken along line 5-5 in FIG. 4.

FIGS. 5A and 5B are cross-sectional views of lower steps 30 in the partially deployed and the fully deployed configurations respectively, taken along line 5-5 in FIG. 4. Movement T48 of first connecting rod 48 can cause rotation R50 of second shaft 50 via second crank 52. Rotation R50 of second shaft 50 can then cause movement T54 of second connecting rod 54 via third crank 56. Second end 54B of second connecting rod 54 can be drivingly coupled to lower step 30B via bracket 58 which can be fixedly secured to lower step 30B. For example, second end 54B of second connecting rod 54 can be pivotally coupled to bracket 58 at pivot point P4.

Lower step 30B can be pivotally coupled to a structure of door 12 at pivot point P5. Lower step 30A can be pivotally coupled to the structure of door 12 at pivot point P6. Accordingly, lower steps 30A and 30B can be rotatable about rotation axes that are different from each other. For example, the respective rotation axes of lower steps 30A and 30B can be parallel but spaced apart from each other.

Lower steps 30A, 30B can be drivingly coupled to each other via arm 60. A first end of arm 60 can be pivotally coupled to lower step 30B at pivot point P7 and a second end of arm 60 can be pivotally coupled to lower step 30A at pivot point P8.

During deployment or stowing of lower steps 30, movement T54 of second connecting rod 54 can, via bracket 58, cause rotation of lower step 30B about pivot point P5. The rotational movement of lower step 30B can be transferred to lower step 30A via arm 60 so that lower step 30A is caused to rotate about pivot point P6. Accordingly, movement of lower step 30B can be used to drive the movement of lower step 30A.

In reference to FIGS. 4, 5A and 5B, handrail 34 of door system 22 can be drivingly coupled to lower steps 30 via a load transfer path defined by:

support link 36 having first end 36A pivotally coupled to handrail 34 and opposite second end 36B;

rotatable first shaft 44 drivingly coupled to second end 36B of support link 36;

first connecting rod 48 having first end 48A coupled to first shaft 44 via first crank 46 and opposite second end 48B;

rotatable second shaft 50 drivingly coupled to second end 48B of first connecting rod 48 via second crank 52; and second connecting rod 54 having first end 54A coupled to second shaft 50 via third crank 56 and opposite second end 54B drivingly coupled to lower steps 30 via bracket 58 for example.

In some embodiments, the load transfer path between handrail 34 and lower steps 30 can be defined by the elements listed above in the order listed above. In various embodiments, the load transfer path can comprise additional or fewer elements than those listed above. In some embodiments, the load transfer path can comprise different elements than those listed above.

In some embodiments, door system 22 can comprise suitable hard stop surfaces 62, 64 that provided additional stability of one or more of lower steps 30. For example, hard stop surface 62 can be provided on a structure that rotates with lower step 30A and hard stop surface 64 can be provided on a structure of door 12 that is fixed relative to lower step 30A. FIG. 5A shows hard stop surfaces 62, 64 that are spaced apart from each other when lower steps 30 are partially deployed. FIG. 5B shows hard stop surfaces 62, 64 that are in contact with each other when lower steps 30 are fully deployed. Hard stop surfaces 62, 64 can transfer some load from passengers stepping on lower steps 30 directly into the fixed structure of door 12 to provide stability instead of relying entirely on the deployment/stowing mechanism to hold lower steps 30 in place and provide the required stiffness.

FIG. 6 is a flowchart of method 100 for actuating one or more lower steps 30 of stairs integrated with passenger door 12 of a mobile platform such as aircraft 10. Method 100 can be conducted using door system 22 described herein. Method 100 can comprise:

using movement of door 12 to drive a movement (e.g., deployment and/or stowing) of handrail 34 associated with stairs (e.g., airstair 28) (see block 102); and using the movement of handrail 34 to drive a movement (e.g., deployment and/or stowing) of lower step (e.g., lower step(s) 30A and/or 30B) (see block 104).

In some embodiments, the movement of handrail 34 can be used to drive the movement of lower step 30 via one or more components of the mechanism shown in FIG. 4. For example, the movement of handrail 34 can be used to drive a rotation of first shaft 44, the rotation of first shaft 44 can be used to drive a rotation of second shaft 50, and, the rotation of second shaft 50 can be used to drive a movement of lower step 30.

In some embodiments, method 100 can use the movement of lower step 30B to drive the movement of lower step 30A (e.g., via arm 60).

The mechanisms and methods described herein can be used to deploy and/or stow lower steps 30. Accordingly, method 100 can comprise using an opening movement of door 12 to drive a deployment of handrail 34 and consequently a deployment of lower steps 30. On the other hand, method 100 can comprise using a closing movement of door 12 to drive a stowing of handrail 34 and consequently a stowing of lower steps 30.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. An aircraft comprising:
   a fuselage;
   a door pivotally coupled to the fuselage, the door having an interior side facing an interior of the aircraft when the door is closed and an exterior side facing an exterior of the aircraft when the door is closed, the interior side of the door defining an airstair permitting passengers to board the aircraft when the door is open, the airstair having a lower step deployable from a stowed configuration when the door is closed to a deployed configuration when the door is open, the airstair including a plurality of non-deployable steps that are higher than the lower step when the door is open;
   a handrail associated with the airstair, the handrail being deployable from a stowed configuration when the door is closed to a deployed configuration when the door is open, a deployment of the handrail being coordinated with an opening of the door, the handrail being drivingly coupled to the lower step via a mechanism including:
      a rotatable first shaft drivingly coupled to the handrail so that the deployment of the handrail drives a rotation of the first shaft; and
      a rotatable second shaft drivingly coupled to the first shaft and to the lower step so that rotation of the first shaft drives a rotation of the second shaft, and that the rotation of the second shaft drives a deployment of the lower step;
      a first connecting rod having a first end coupled to the first shaft via a first crank and an opposite second end; and
      the second shaft drivingly coupled to the second end of the first connecting rod so that rotation of the first shaft causes movement of the first connecting rod which drives the rotation of the second shaft,
   wherein the mechanism is hidden from view by the plurality of non-deployable steps.

2. The aircraft as defined in claim 1, wherein:
the handrail is pivotally coupled to the fuselage and coupled to the door via a support link;
   a first end of the support link is pivotally coupled to the handrail;
   an opposite second end of the support link is pivotally coupled to the door; and
   the second end of the support link is drivingly coupled to the first shaft so that rotation of the support link caused by the deployment of the handrail drives the rotation of the first shaft.

3. The aircraft as defined in claim 1, comprising a second crank coupled for common rotation with the second shaft, wherein:
   the second shaft is parallel and spaced apart from the first shaft; and
   the second end of the first connecting rod is coupled to the second crank so that movement of the first connecting rod causes rotation of the second shaft.

4. The aircraft as defined in claim 3, wherein the second shaft is drivingly coupled to the lower step via a second connecting rod.

5. The aircraft as defined in claim 4, wherein the second connecting rod is coupled to the second shaft via a third crank coupled for common rotation with the second shaft.

6. The aircraft as defined in claim 5, wherein:
   the lower step is a first lower step that is a lowermost step on the airstair when the door is open;
   the airstair comprises a second lower step immediately succeeding the first lower step;
   the second lower step is deployable from a stowed configuration when the door is closed to a deployed configuration when the door is open; and
   the first and second lower steps are coupled together for coordinated deployment.

7. The aircraft as defined in claim 6, wherein:
   the first lower step is rotatable about a first rotation axis;
   the second lower step is rotatable about a second rotation axis different from the first rotation axis;
   the second connecting rod is coupled to the second lower step to cause rotation of the second lower step about the second rotation axis; and
   the second lower step is drivingly coupled to the first lower step via an arm to cause rotation of the first lower step about the first rotation axis.

8. The aircraft as defined in claim 1, wherein:
   the lower step is a first lower step that is a lowermost step on the airstair when the door is open;
   the airstair comprises a second lower step immediately succeeding the first lower step;
   the second lower step is deployable from a stowed configuration when the door is closed to a deployed configuration when the door is open; and
   the first and second lower steps are coupled together for coordinated deployment.

9. The aircraft as defined in claim 1, wherein the handrail is drivingly coupled to the lower step via a load transfer path defined by:
   a support link having a first end pivotally coupled to the handrail and an opposite second end;
   the rotatable first shaft drivingly coupled to the second end of the support link;
   the rotatable second shaft drivingly coupled to the second end of the first connecting rod via a second crank; and
   a second connecting rod having a first end coupled to the second shaft via a third crank and an opposite second end drivingly coupled to the lower step.

10. A passenger door system for a mobile platform, the system comprising:

a door configured to be pivotally coupled to a structure of the mobile platform, the door having an interior side facing an interior of the mobile platform when the door is closed and an exterior side facing an exterior of the mobile platform when the door is closed, the interior side of the door defining stairs permitting passengers to board the mobile platform when the door is open, the stairs comprising a lower step deployable from a stowed configuration when the door is closed to a deployed configuration when the door is open, the stairs including a plurality of non-deployable steps that are higher than the lower step when the door is open;

a handrail associated with the stairs, the handrail being deployable from a stowed configuration when the door is closed to a deployed configuration when the door is open, a deployment of the handrail being coordinated with an opening of the door, the handrail being drivingly coupled to the lower step via a mechanism including:

a rotatable first shaft drivingly coupled to the handrail so that the deployment of the handrail drives a rotation of the first shaft; and a rotatable second shaft drivingly coupled to the first shaft and to the lower step so that rotation of the first shaft drives a rotation of the second shaft, and that rotation of the second shaft drives a deployment of the lower step;

a first connecting rod having a first end coupled to the rotatable first shaft via a first crank and an opposite second end; and the rotatable second shaft drivingly coupled to the second end of the first connecting rod so that rotation of the first shaft causes movement of the first connecting rod which drives the rotation of the rotatable second shaft, wherein the mechanism is hidden from view by the plurality of non-deployable steps.

11. The system as defined in claim 10, wherein:
the handrail is coupled to the door via a support link;
a first end of the support link is pivotally coupled to the handrail;
an opposite second end of the support link is pivotally coupled to the door; and
the second end of the support link is drivingly coupled to the first shaft so that rotation of the support link caused by the deployment of the handrail drives the rotation of the first shaft.

12. The system as defined in claim 10, comprising:
a second crank coupled for common rotation with the second shaft;
wherein:
the second shaft is parallel and spaced apart from the first shaft; and
the second end of the first connecting rod is coupled to the second crank so that movement of the first connecting rod causes rotation of the second shaft.

13. The system as defined in claim 12, wherein the second shaft is drivingly coupled to the lower step via a second connecting rod.

14. The system as defined in claim 13, wherein the second connecting rod is coupled to the second shaft via a third crank coupled for common rotation with the second shaft.

15. The system as defined in claim 14, wherein:
the lower step is a first lower step that is a lowermost step on the stairs when the door is open;
the stairs comprise a second lower step immediately succeeding the first lower step;
the second lower step is deployable from a stowed configuration when the door is closed to a deployed configuration when the door is open; and
the first and second lower steps are coupled together for coordinated deployment.

16. The system as defined in claim 15, wherein:
the first lower step is rotatable about a first rotation axis;
the second lower step is rotatable about a second rotation axis different from the first rotation axis;
the second connecting rod is coupled to the second lower step to cause rotation of the second lower step about the second rotation axis; and
the second lower step is drivingly coupled to the first lower step via an arm to cause rotation of the first lower step about the first rotation axis.

* * * * *